US010615554B2

(12) United States Patent
Truluck et al.

(10) Patent No.: US 10,615,554 B2
(45) Date of Patent: Apr. 7, 2020

(54) MULTI-FUNCTIONAL CORD APPARATUS AND SYSTEM

(71) Applicant: Tru-Lock Technologies LLC, Charleston, SC (US)

(72) Inventors: Ashley Wilson Truluck, Charleston, SC (US); Kathryn Truluck Krogh, Charleston, SC (US)

(73) Assignee: TRI-LOCK TECHNOLOGIES LLC, Charleston, SC (US)

( * ) Notice: Subject to any disclaimer, the term of this patent is extended or adjusted under 35 U.S.C. 154(b) by 157 days.

(21) Appl. No.: 15/793,540

(22) Filed: Oct. 25, 2017

(65) Prior Publication Data

US 2018/0115130 A1 Apr. 26, 2018

Related U.S. Application Data

(60) Provisional application No. 62/413,063, filed on Oct. 26, 2016.

(51) Int. Cl.
*G06F 21/00* (2013.01)
*H01R 31/06* (2006.01)
(Continued)

(52) U.S. Cl.
CPC ......... *H01R 31/065* (2013.01); *G06F 13/385* (2013.01); *G06F 13/4068* (2013.01);
(Continued)

(58) Field of Classification Search
CPC ........ G06F 21/30; G06F 21/44; G06F 21/445; G06F 21/45; G06F 21/50; G06F 21/70; G06F 21/81; G06F 21/82; G06F 21/85
See application file for complete search history.

(56) References Cited

U.S. PATENT DOCUMENTS

| 7,271,568 B2 | 9/2007 | Purdy et al. |
| 7,426,585 B1 | 9/2008 | Rourke |

(Continued)

FOREIGN PATENT DOCUMENTS

| WO | 2014127998 A2 | 8/2014 |
| WO | 2016013011 A1 | 1/2016 |
| WO | 2016013013 A1 | 1/2016 |

OTHER PUBLICATIONS

Author unknown. "Smart Cable Aids Quality Control and Authentication. Application Note 4623." 3 pages. Oct. 15, 2009. Maxim Integrated Products, Inc. Viewed online Oct. 26, 2017 at https://www.maximintegrated.com/en/app-notes/index.mvp/id/4623.
"SmartCord Live with Escort Live." Manual for iPhone. 23 pages. 2011. ESCORT Inc., West Chester, OH. Viewed online Oct. 26, 2017 at https://www.escortradar.com/pdf/Escort-Live-Manual-iPhone.pdf.

*Primary Examiner* — Edward Zee
(74) *Attorney, Agent, or Firm* — Gregory Finch; Finch Paolino, LLC

(57) ABSTRACT

A multi-functional cord that can be used in connection with one or more user devices specified by a user associated with the cord. The user may program the multi-functional cord to enable the multi-functional cord to operate in a particular manner when associated with a first user device and may preclude the multi-functional cord from operating when associated with a second user device. The multi-functional cord may also, or alternatively, be pre-programmed to work with a particular user device, such as, in a non-limiting example, when the multi-functional cord is sold with the user device.

17 Claims, 5 Drawing Sheets

(51) Int. Cl.

| | | |
|---|---|---|
| *G06F 13/38* | (2006.01) | |
| *H01R 13/66* | (2006.01) | |
| *H02J 7/00* | (2006.01) | |
| *G06F 21/44* | (2013.01) | |
| *G06F 13/40* | (2006.01) | |
| *G06F 21/85* | (2013.01) | |
| *G06F 21/45* | (2013.01) | |
| *G06F 21/30* | (2013.01) | |
| *G06F 21/50* | (2013.01) | |

(52) U.S. Cl.
CPC .............. *G06F 21/30* (2013.01); *G06F 21/44* (2013.01); *G06F 21/45* (2013.01); *G06F 21/50* (2013.01); *G06F 21/85* (2013.01); *H01R 13/6691* (2013.01); *H02J 7/0004* (2013.01); *H01R 31/06* (2013.01); *H02J 2007/0062* (2013.01)

(56) References Cited

U.S. PATENT DOCUMENTS

| | | |
|---|---|---|
| 8,095,713 B2 | 1/2012 | Minoo et al. |
| 8,907,221 B1 | 12/2014 | Mohanty et al. |
| 9,148,001 B1 | 9/2015 | Mohanty et al. |
| 2010/0075604 A1* | 3/2010 | Lydon .................... G06F 21/31 455/41.3 |
| 2010/0173673 A1* | 7/2010 | Lydon .................. G06F 21/445 455/557 |
| 2015/0035473 A1 | 2/2015 | Zhou et al. |
| 2015/0333545 A1* | 11/2015 | Luce ..................... H02J 7/0052 320/137 |
| 2015/0365237 A1* | 12/2015 | Soffer .................... G06F 21/85 726/20 |
| 2016/0062939 A1 | 3/2016 | Smith et al. |
| 2016/0373408 A1* | 12/2016 | Wentworth ......... H04L 63/0227 |

* cited by examiner

MULTI-FUNCTIONAL CORD APPARATUS AND SYSTEM

CROSS-REFERENCE TO RELATED APPLICATIONS

This application claims the benefit of U.S. Provisional Application No. 62/413,063, filed on Oct. 26, 2016, the disclosure of which is hereby incorporated by reference in its entirety.

FIELD

The present disclosure relates to the field of power and data cords for mobile electronic devices; in particular, a multi-functional cord that can be selectively restricted for use with one or more user devices as specified by a user.

BACKGROUND

Power and data cords for electronic, wireless mobile devices, and other user devices (e.g., tablet computers, laptop computers, desktop computers, gaming devices, server devices, etc.) have become a ubiquitous commodity. By way of example, other than differences between species of cords for IOS-based devices (e.g., IPHONE, IPOD, IPAD, etc.) and those associated with ANDROID devices (e.g., wireless phones, tablet computers, etc. by SAMSUNG, MOTOROLA LG, HTC, etc.), such cords have become interchangeable between devices within the same species. For example, if a user is in possession of a cord for a particular ANDROID-based device (e.g., a SAMSUNG GALAXY S6 EDGE), he or she may use the same cord to power (or communicate with) another device of the same species (e.g., an ANDROID LG V10). In another example, if a user is in possession of a cord for a particular IOS-based device (e.g., an IPHONE 7S), he or she may use the same cord to power (or communicate with) another IOS device (e.g., an IPAD MINI 4).

While the interchangeability of power and data cords has its advantages, there are several disadvantages. For example, interchangeable cords lack sufficient deterrence to "borrowing" or theft of the cord or the device with which it was originally associated. If cords were not interchangeable, the would-be borrower and/or thief would need to misappropriate both the device and the cord in order to use the device.

Additionally, the interchangeability of cords may represent a security risk to a device. For example, an unauthorized device may use any cord to transmit information and/or data to or receive information and/or data from a device. Such communication from an unauthorized device presents a security risk to the device.

There is a need for a programmable cord that can be assigned to a single device or multiple devices that the owner designates. There is a need for a programmable cord that can be used for data transfer, charging, or for security (e.g., firewall, authentication, etc.).

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

An object of the present disclosure is a programmable cord for mobile electronic devices that can be used for data transfer, charging, or for security (e.g., firewall, authentication, etc.).

Another object of the present disclosure is a smart charging cord via which electrical power signals, and/or electrical and/or optical communication signals can be transmitted, and can be programmed to be assigned to a single device or multiple devices.

Another object of the present disclosure is a smart charging cord that may be preprogrammed (e.g., during manufacture, during packaging with a user device, etc.) to store information associated with a user device with which the cord is associated. Alternatively, the smart charging cord may be purchased separately and programmed using a mobile application to associate the smart charging cord with the user device.

Another object of the present disclosure is a smart charging cord mobile application that is downloadable to a user device and operable to program a smart charging cord controller to associate the cord with the user device and/or other authorized devices. The mobile application may enable the user device to communicate with the cord via a wired or wireless communications interface. The mobile application may be used to program the cord to permit data transfer, charging and security functionality when connected to multiple devices. The mobile application may enable the user device to be able to track the location of the cord (using GPS or WiFi) in the event it is misplaced. The smart cord may authenticate based on the user device information or user information or based on time or geographic location.

Another object of the present disclosure is a smart charging cord that selectively enables a user device to selectively restrict power or communication signals from traveling to or from a non-authenticated power source, data source or user device. The cord may store and execute instructions that block transmission of packets and/or traffic received from non-authenticated devices and/or IP addresses from being transmitted to the user device. The cord may store and execute instructions to identify when malicious software has been detected, and/or when an electronic attack has been initiated and/or is underway, and prevent transmission to the user device.

A specific embodiment of the present disclosure includes a controller for use with a mobile electronic device, the controller comprising a first connector configured to operably interface with a mobile electronic device to deliver power or data to the mobile electronic device; a second connector configured to receive power or data from a power source or a data source; an electronics module operably engaged with the first connector and the second connector, the electronic module comprising a processor, a non-transitory computer readable medium, and circuitry operable to selectively transmit or receive data or power between the second connector and the first connector in response to one or more operations by the processor, the non-transitory computer readable medium having stored thereon a set of instructions executable by the processor to cause the processor to perform the one or more operations, the set of instructions comprising: instructions for authenticating the mobile electronic device associated with the first connector; instructions for authenticating the power source or the data source associated with the second connector; and, instructions for selectively transmitting data or power between the first connector and the second connector in response to one or more transfer parameters.

Another specific embodiment of the present disclosure includes an apparatus comprising a cord having a first connector configured to operably interface with an electronic device or power source, the cord being comprised of one or more electrical conductors operable to transmit electrical power signals or data packets therethrough; and, a controller operably coupled to the cord and being configured to receive the electrical power signals or data packets from the cord, the controller being comprised of an electronics module and a second connector configured to operably interface with a mobile electronic device, the electronics module comprising a processor, a non-transitory computer readable medium, and circuitry operable to selectively transmit the electrical power signals or data packets from the cord to the mobile electronic device in response to one or more operations by the processor, the non-transitory computer readable medium having stored thereon a set of instructions to cause the processor to perform the one or more operations, the set of instructions comprising instructions for authenticating the mobile electronic device; and, instructions for selectively transmitting the electrical power signals or data packets from the cord to the mobile electronic device.

Yet another specific embodiment of the present disclosure includes a multi-functional cord system, comprising a cord having a first connector configured to operably interface with an electronic device or power source, the cord being comprised of one or more electrical conductors operable to transmit electrical power signals or data packets therethrough; a controller operably coupled to the cord and being configured to receive the electrical power signals or data packets from the cord, the controller being comprised of an electronics module and a second connector, the electronics module comprising a processor, a non-transitory computer readable medium, and circuitry operable to selectively transmit the electrical power signals or data packets from the cord to the second connector; and, a mobile software application executing on a mobile electronic device, the mobile software application being operable to receive a user input and communicate the user input to the electronics module, the user input corresponding to a set of instructions to cause the processor to perform the one or more operations associated therewith, the set of instructions comprising instructions for selectively transmitting the electrical power signals or data packets from the second connector to an authenticated mobile electronic device.

Yet another specific embodiment of the present disclosure is a controller for use with an electronic device, the controller comprising: a first connector configured to operably interface with an authenticated electronic device to receive or transmit power or data to or from the authenticated electronic device; a second connector configured to receive or transmit power or data from a power source or a data source; and, an electronics module operably engaged with the first connector and the second connector to selectively facilitate the transmission of power or data therebetween, the electronics module comprising a non-transitory computer readable medium and circuitry operable to restrict the transmission of data or power from the first connector to or from a non-authenticated electronic device, the non-transitory computer readable medium having one or more authentication parameters stored thereon for authentication of the authenticated electronic device.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components. The above and other objects, features and advantages of the present disclosure will be more apparent from the following detailed description taken in conjunction with the accompanying drawings, in which.

DETAILED DESCRIPTION

Figure 1:
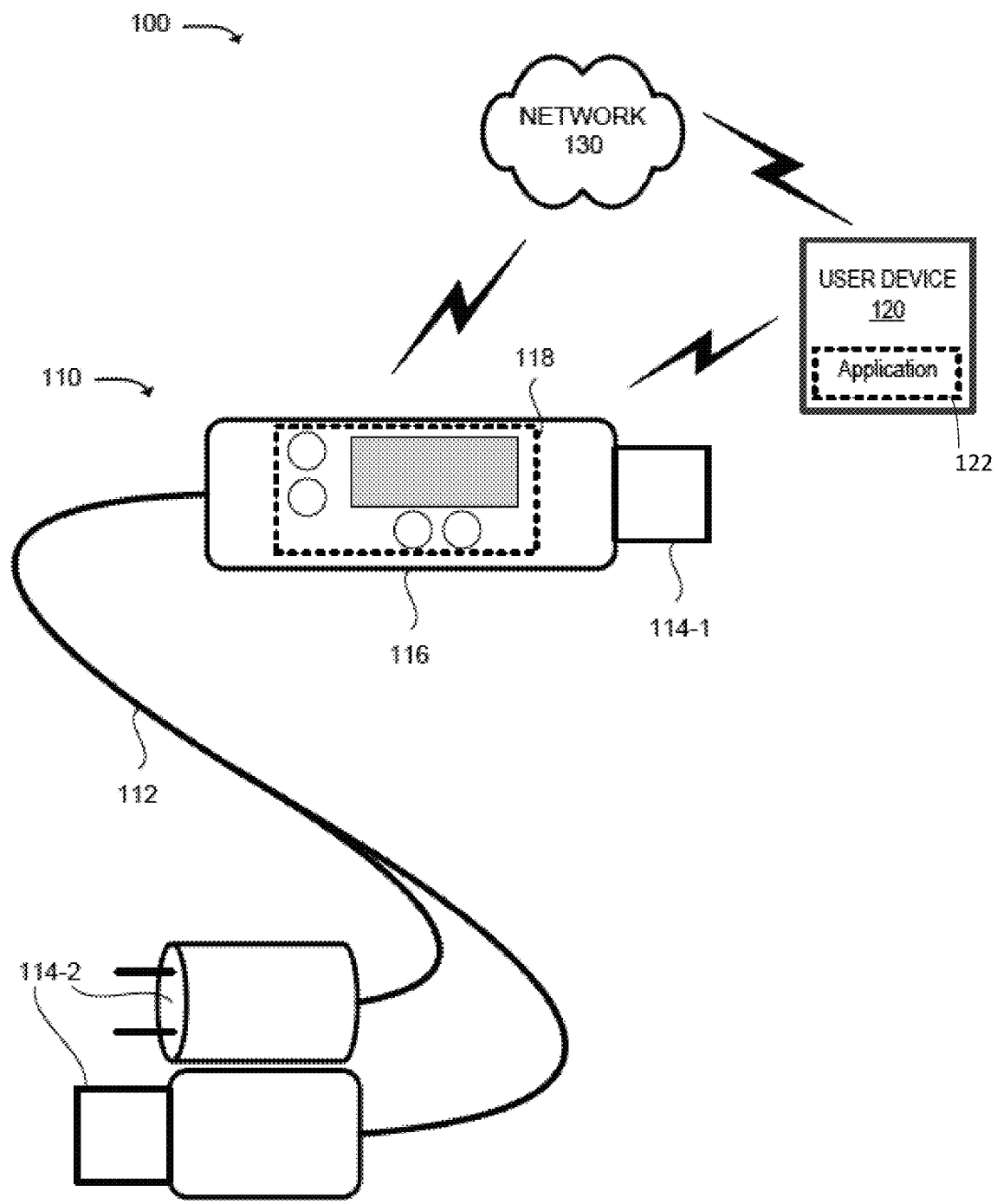
FIG. 1 illustrates a diagram of an example environment in which the systems, methods, and/or devices described herein may be implemented.

FIGS. 1-5 are attached hereto and incorporated herein by reference. The following detailed description refers to the accompanying FIGS. 1-5. The same reference numbers in different figures may identify the same or similar elements.

The device, systems, methods, technologies and/or techniques described herein may provide a multi-functional cord that can be used in connection with one or more user devices specified by a user associated with the cord. The user may program the multi-functional cord to enable the multifunctional cord to operate in a particular manner when associated with a first user device and may preclude the multi-functional cord from operating when associated with a second user device. The multi-functional cord may also, or alternatively, be pre-programmed to work with a particular user device, such as, in a non-limiting example, when the multi-functional cord is sold with the user device.

The multi-functional cord may include a cord that is capable of enabling or precluding electrical power, and/or electrical and/or optical data signals from traveling via the multi-functional cord (sometimes referred to as "data transfer"). The cord may include and/or be connected to (permanently or temporarily) at least one connector at each end of the cord. The multi-functional cord may include a control block, to be described in greater detail below, to manage and/or control the manner in which the multi-functional cord can operate, with which user device to operate or not operate, and/or with which user to operate or not operate. Additionally, or alternatively, the multi-functional cord may work with a gaming device, head phones, an audio device, a computer peripheral device (e.g., a printer, hard drive, etc.), or some other communication and/or computing device. The term "connect" or "connected" may be a wireless connection, a wired connection, or a combination of wired and wireless connections.

The control block may be programmed by a user, of a first user device, with administrative rights (e.g., such as a user that purchased and/or set up the multi-functional cord). Alternatively, the user may use the first user device, that stores and/or executes an application (a multi-functional cord application), to program the control block based on information and/or parameters specified by the user. The first user device may communicate with the control block via a network (e.g., based on an Internet version 6 (IPV6) protocol, a Hypertext Transfer Protocol (HTTP), a secure HTTP protocol (HTTPS), a tunneling protocol, and the like) and/or via wired or wireless link (e.g., a BLUETOOTH protocol, a near-field protocol, beaming, etc.). The multi-functional cord may, for example, enable electrical power (e.g., direct current (DC) and/or alternating current (AC)), and/or data transfer to and/or from a first user device that has been authorized by the user. The multi-functional cord may also, or alternatively, perform a security operation by permitting data and/or traffic to flow to and/or from one or more other devices (e.g., other user devices, server devices, etc.) and/or network addresses (e.g., a web address, an Internet Protocol (IP) address, a media access control (MAC) address, a uniform resource locator (URL), etc.) that are authorized by the user of the first user device. The multi-functional cord may also, or alternatively, perform a security operation that blacklists one or more other user devices and/or network addresses by precluding communications with a blacklisted user device and/or network address as specified by the user. The security operation may also, or alternatively, include authenticating a user, user device, or some other device with which multi-functional cord is connected. The security operation may also include providing virus protection services, firewall services, etc.

The user may program the control block in a manner that grants different access rights and/or services to different user devices and/or different users. For example, the user may program the multi-functional cord so that the first device may use all functionality of the multi-functional cord; a second user device may have access to less functionality; and/or a third user device may not have access to any functionality of the multi-functional cord.

Additionally, or alternatively, the user may program the multi-functional cord in a manner that grants functionality based on rights granted to other users of other user devices. For example, the user may program the multi-functional cord in a manner that permits a second user, of a second user device, rights to access those functions authorized by the user, while precluding a third user, associated with a third user device, from accessing some or all of the functions accessible by the second user. In this case, the second user may use the multi-functional cord for any device with which the second user is associated and the third user may be denied use of the multi-functional cord regardless of which user device with which the third user is associated.

FIG. 1 illustrates a diagram of an example multi-functional cord system 100 in which the systems, methods, and/or devices described herein may be implemented. As shown in FIG. 1, multi-functional cord system 100 may include a multi-functional cord 110 (hereinafter, "cord 110"), user device 120 and network 130. The devices, components and networks, illustrated in FIG. 1 are provided for explanatory purposes only, and multi-functional cord system 100 is not intended to be limited to the devices, components, or networks provided therein. There may be additional devices, components or networks; fewer devices, components or networks; different devices, components or networks; or differently arranged devices, components or networks than illustrated in FIG. 1. Also, in some implementations, one or more of the devices, components or networks of FIG. 1 may perform one or more functions described as being performed by another one or more of the devices, components or networks of FIG. 1.

Multi-functional cord 110 may include a cord 112, connectors 114-1 and 114-2 (hereinafter, each a "connector 114" and together "connectors 114") and a control block 116. Cord 112 may include one or more first conductive wires (e.g., formed by copper, aluminum, gold, silver, and/or some other conductive material) to carry and/or transport one or more electrical power and/or data signals (e.g., power cord, a Universal Serial Bus (USB), an Ethernet cable, a coaxial cable, etc.) based on electrical power and/or signals flowing via the conductive wires. Cord 112 may also, or alternatively, include one or more optical fibers to carry data and traffic based on light signals traveling via the one or more optical fibers. Connector 114 may enable multi-functional cord 110 to connect to a user device 120 and/or some other user device 120. In a non-limiting example, connector 114 may correspond to a Universal Serial Bus (USB), a micro-USB, an IOS (LIGHTNING), an Ethernet cable jack or connector, a coaxial cable connector, a single or multi-mode fiber optic connector, or some other connector or interface, to connect multi-functional cord 110 to a first user device 120 (e.g., via connector 114-1) and/or a second user device 120 (e.g., via connector 114-2) to enable traffic to flow between first user device 120 and second user device 120 via network 130. Additionally, or alternatively, connector 114 may correspond to a DC plug or interface, to connect to a DC power source (e.g., a battery charger, a battery pack, etc.) and/or a conventional AC plug and/or USB, mini-USB, or IOS connector that connects to an AC adaptor that connects to an AC power source to enable user device 120 to be charged.

Control block 116, to be described in greater detail in FIG. 2 below, may be programmed by a user to identify with which user device 120 multi-functional cord 110 is authorized to communicate, provide power, and/or to provide a service. Control block 116 may include a user interface 118 that includes one or more buttons, displays, touch screens, etc. with which a user may interact to program and/or control multi-functional cord 110. Control block 116 may also, or alternatively, be programmed to identify which other user, associated with another user device 120, is authorized to use multi-functional cord 110. The user may program control block 116 by interacting with user interface 118 (e.g., by pressing one or more buttons, interacting with a touch screen, etc.) and/or by interacting with an application executing on user device 120 that can communicate with control block 116 via network 130, directly using near-field communication (e.g., blue tooth, beaming, and/or some other near-field protocol), and/or via a wired connection (e.g., such as connector 114). Control block 116 may, for example, authenticate a first user device 120 when the user has specified that multi-functional cord 110 is authorized to interact and/or communicate with first user device 120 and/or to charge first user device 120. Control block 116 may not authenticate a second user device 120 when the user has specified that multi-functional cord 110 is not authorized to interact and/or communicate with second user device 120 and/or to charge second user device 120.

Control block 116 may determine which function and/or service is to be performed based on input received from an authorized user and/or user device 120. For example, control block 116 may determine whether multi-functional cord 110 is to enable a charging service to be provided to user device 120. In another non-limiting example, control block 116 may determine whether multi-functional cord 110 is to enable a communication service to be provided to user device 120. In yet another non-limiting example, control block 116 may determine whether multi-functional cord 110 is to provide a security service to user device 120. The security service may include a user authentication service, a user device 120 authentication service, a firewall service (e.g., by blocking unauthorized user devices 120 and/or network addresses), a virus detection service, etc.

Control block 116 may authenticate a first user device 120 connected to a first connector 114 (e.g., 114-1) at one end of multi-function cord 110 and/or may authenticate a second user device 120 connected to second connector 114 (e.g., connector 114-2) at an opposite end of multi-function cord 110. Authentication of the first and second user devices 120 may enable a communication session to be established between first and second user devices 120 if control block 116 stores information indicating that both first and second user devices 120 are authorized to send and/or receive data. Authentication of the first and second user devices 120 may enable second user device 120 to charge first user device 120 if control block 116 stores information indicating that second user device 120 is authorized to provide electrical power via multi-functional cord 110 and first user device 120 is authorized to receive electrical power via multi-functional cord 110.

User device 120 may include any computation or communication device, such as a wireless mobile communication device, that is capable of communicating with network 130, directly or indirectly. For example, user device 120 may include a personal communications system (PCS) terminal (e.g., such as a smart phone that may include data processing and data communications capabilities), a personal digital assistant (PDA) (e.g., that can include a pager, Internet/intranet access, etc.), a laptop computer, a tablet computer, a personal computer, a camera, a personal gaming system, or another type of computation or communication device. Additionally, or alternatively, user device 120 may include logic, such as one or more processing or storage devices, that can be used to perform processing activities on behalf of a user.

In one example implementation, user device 120 may include a global positioning satellite (GPS) component that communicates with a GPS constellation to provide and/or obtain location information associated with user device 120. Additionally, or alternatively, user device 120 may include logic, such as one or more processing or storage devices, that can be used to perform and/or support processing activities on behalf of a user.

User device 120 may perform communication operations by sending data to and/or receiving data from another device, such as another user device 120, multi-functional cord 110 and/or a server device. Data may refer to any type of machine-readable information having substantially any format that may be adapted for use in one or more networks and/or with one or more components. Data may include digital information or analog information. Data may further be packetized and/or non-packetized. User device 120 may include logic for performing computations on user device 120 and may include the components illustrated in FIG. 4 in an example implementation. Such components may execute one or more instructions to perform functions as described herein.

User device 120 may include an input device for the input of information, as further described herein, and/or a display device to display information, as further described herein. Additionally, or alternatively, the user device may include an input and/or output mechanism that may allow for the transfer of data, including sensitive data, from/to the user device from/to a server and/or another user device. In one non-limiting implementation, the user device may not be in persistent communication and/or connection with network but may, when accessed and/or communicated with, communicate with a server and/or another user device.

User device 120 may store, install and/or execute an application (e.g., a mobile application, logic, software application installed on a user device, etc.) that enables the user to communicate with, set up and/or manage multi-functional cord 110. For example, the user may open the application on user device 120 and may associate multi-functional cord 110 with user device 120 and/or the user by causing information associated with user device 120 (e.g., a mobile directory number (MDN), an electronic serial number, etc.) and/or the user (e.g., a name, address, personal identification number (PIN), a password, a subscriber identity module (SIM), uniform resource identifier (URI), biometric information associated with the user (e.g., a copy of a fingerprint, a retina scan, etc.) to be transmitted to and/or stored in a memory associated with multi-functional cord 110. The user may identify one or more other user devices 120 and/or users to be authorized use of multi-functional cord 110. The user may also, or alternatively, identify one or more services that the other authorized user devices 120 and/or users may access. In a non-limiting example, a second user device 120 may be authorized to use multi-functional cord 110 to charge second user device 120. In yet another non-limiting example, a fourth user device 120 may be authorized to use multi-functional cord 110 to send or receive data and receive a security service (e.g., authentication, blacklist, firewall, virus protection, and/or other security service. In still another non-limiting example, a fifth user device 120 may be authorized to use multi-functional cord 110 only when a second authorized user is using the fifth user device 120.

Network 130 may include one or more wired and/or wireless networks. For example, network 130 may include a wide area network (WAN) a metropolitan network (MAN), a telephone network (e.g. the Public Switched Telephone (PSTN)), an ad hoc network, an intranet, the Internet, a fiber optic based network, and/or a combination of these or other types of networks. Additionally, or alternatively, network 130 may include a cellular network, a public land mobile network (PLMN), a second generation (2G) network, a third generation (3G) network, a fourth generation (4G) network (e.g., a long-term evolution (LTE) network), a fifth generation (5G) network, and/or another network.

Referring still to FIG. 1, additional details and/or alternatives regarding multi-functional cord system 100 are described below, which may include features of one or more implementations and embodiments of multi-functional cord system 100 as well as the associated methods and apparatuses as implemented therein.

The hardware and architecture of multi-functional cord system 100 may include, but is not limited to, the following components:

A cord 112 (for example, cord 112 as described above) via which electrical power signals, and/or electrical and/or optical communication signals can be transmitted. Such cord may include one or more electrical conductors and/or optical fibers via which the signals may travel such as a power cord, USB data cord, Ethernet cord, coaxial cable, optical fiber, fiber cable, etc.

A control block (for example, control block 116 as described above) that is connected to or made part of a first end of the cord and which includes a first connector (e.g., without limitation a first universal serial bus (USB), micro-USB, IOS (LIGHTNING) connector, Ethernet jack, coaxial cable connector, etc.) that can plug into any device possessing a compatible connector (for example, connector 114-1 as described above). The control block may be plugged into, communicate with, or charge any device that can be authenticated by the control block. The control block may include: a processor; a memory; a communication interface (e.g., one or more buttons); a display (e.g., LED, LCD, command line, etc.); a transmit/receive module, etc.; and a second connector (e.g., a second USB, micro USB, LIGHTNING, optical fiber connector, Ethernet jack, coaxial cable connector, connector, AC plug, DC plug, etc.); and, a battery pack of one or more batteries and a charge device to control battery pack charging or to control the discharge of the battery pack to charge a device with which the control block is connected.

A second connector (for example, connector 114-2 as described above) that is connected to or made part of a second end of the cord that is opposite the first end with which the control block is associated. The second connector may correspond to a conventional alternating current (AC) plug, a direct current (DC) plug, USB, micro-USB, IOS (LIGHTNING) connector, optical fiber connector, Ethernet jack, coaxial cable connector, etc.) that can plug into (i) a power source (e.g., DC, AC, an optical, etc. source) or an adaptor that accepts the second connector (e.g., a block that plugs into a DC, AC, optical, etc. source). Connecting the Multifunctional Cord to the power source may charge the battery pack and/or may cause the Multifunctional Cord to permit the battery pack to charge a device with which the control block is connected; (ii) a data source, such as a second device that can charge and/or communicate with the first device with which the control block is associated. Such components may be connected by wired, wireless, or a combination of wired and wireless connections.

A mobile application 122 that is downloadable to the first device to be used to program the control box to associate the cord with the first device. Mobile application 122 may also, or alternatively correspond to software that is installed on and executes on the first device (e.g., a laptop, desk top, etc.), or logic that is based on software, hardware, or a combination of software and hardware. Mobile application 122 may also be used to associate the cord with any other device that the user, of the first device, desires. Mobile application 122 may enable the first device to communicate with the cord via blue tooth or when the cord is plugged into the first device. Mobile application 122 may also control rights associated with multiple devices. For example, mobile application 122 may be used to program the cord to permit data transfer, charging and security functionality when connected to the first device; only charging functionality when connected with a second device, only data transfer and security functionality when connected to a third device, etc.

Mobile application 122 may enable the first device to be able to track the location of the cord (using cord GPS signals) in the event it is misplaced. When the cord is misplaced, the application may enable the first device to be able to communicate with another device to determine whether the cord is connected to the other device.

Various routines and methods implemented by multi-functional cord system 100 may include one or more of the following:

Authentication and Communication with Electronic Device.

Multifunctional Cord 110 may be preprogrammed (e.g., during manufacture, during packaging with a first device, etc.) to store (in the memory) information associated with a first device with which the cord is associated. Alternatively, Multifunctional Cord 110 may be purchased separately and programmed using the application to associate Multifunctional Cord 110 with the first device. The first device information may include information that uniquely identifies the first device (e.g., an electronic serial number (ESN), a mobile equipment identifier (MEID), a mobile directory number (MDN), an international mobile subscriber identity (IMSI), a subscriber identity module uniform resource identifier (SIM URI), etc., that uniquely identifies the first device).

Authentication of the First Device.

A user may connect Multifunctional Cord 110 into the first device. The control block 116 may send a request to the first device to obtain first device information that uniquely identifiers the first device. The first device may receive the request and may transmit the first device information to the control block. Multifunctional Cord 110 may receive the first device information and may compare the received first device information with stored first device information (e.g., stored in the memory). Multifunctional Cord 110 may authenticate the first device when the received first device information matches the stored first device information. Based on the authentication, Multifunctional Cord 110 may enable the first device to: (i) communicate via Multifunctional Cord 110 (e.g., by sending or receiving data); (ii) receive power from the Multifunctional Cord 110 (when Multifunctional Cord 110 is in Charge Mode); or (iii) receive power via Multifunctional Cord 110 from a power source.

Authentication of Multiple Devices.

Authentication may also, or alternatively, include authenticating the first device with which Multifunctional Cord 110 is connected and a second device with which Multifunctional Cord 110 is connected. Communication and/or power transfer between the first and second devices may be permitted when the Multifunctional Cord 110 is able to authenticate both the first and second devices.

Authentication of a User.

Authentication need not be limited to device authentication. For example, authentication may also, or alternatively, include authentication of the user of the first device. For example, the user may be required to enter a password, a personal identification number (PIN), a username, biometric information, an answer to a security question, etc. Multifunctional Cord 110 may receive the entered information associated with the user and may compare it with user information stored in the memory. If the received user information matches the stored user information, Multifunctional Cord 110 may authenticate the user and may enable the first device to (i) communicate via Multifunctional Cord 110 (e.g., by sending or receiving data); (ii) receive power from Multifunctional Cord 110 (when Multifunctional Cord 110 is in Charge Mode); or receive power via the Multifunctional Cord from a power source.

Authentication Based on Time or Geographic Location.

Authentication schemes may be based on location (at or near such location, communications are authorized or not authorized), a time (e.g., authentication may be granted based on a time lease, a time of the day, week, month, year, etc.), etc.

Non-Authentication and Denial of Communication or Power Transfer.

A user may plug the Multifunctional Cord 110 into a second device. If Multifunctional Cord 110 does not store second device information, Multifunctional Cord 110 will prevent power or communication signals from traveling to or from the second device via Multifunctional Cord 110. This feature may deter a user of the second device from borrowing or stealing Multifunctional Cord 110 to use with the second device.

Failure to Authenticate the Second Device.

A user may connect Multifunctional Cord 110 with the second device. Multifunctional Cord 110 may send a request to the second device to obtain second device information that uniquely identifies the second device. The second device may receive the request and may transmit the second device information to Multifunctional Cord 110. Multifunctional Cord 110 may receive the second device information and may compare the received second device information with stored second device information (e.g., if any is stored in the memory). Multifunctional Cord 110 may not authenticate the second device if the received second device information does not match the stored second device information. Based on the failure to authenticate the second device, Multifunctional Cord 110 may preclude the second device from communicating via Multifunctional Cord 110.

Programming the Multifunctional Cord to Communicate with Other Authorized Devices.

Assume that Multifunctional Cord 110 is connected to the first device. The first device may store an application (e.g., an application, a downloadable application, a SaaS application, etc.) that enables the first device to communicate with Multifunctional Cord 110 of the Multifunctional Cord. The user may open the application to identify which devices Multifunctional Cord 110 is authorized to communicate with. In a non-limiting example, Multifunctional Cord 110 may store first device information (that uniquely identifies the first device) and third device information that uniquely identifies a third device (e.g., a third lap top computer, a third smartphone, a third tablet computer, etc.). If the user no longer wishes to authorize Multifunctional Cord 110 to communicate with the third device, the user may use the application to deny authorization (e.g., by associated a flag with the third device information, deleting the third device information, etc.). Additionally, if the user desires to authorize Multifunctional Cord 110 to communicate with a fourth device and may cause the first device or Multifunctional Cord 110 to communicate with the fourth device to obtain fourth device information and may store the fourth device information in the memory associated with Multifunctional Cord 110.

Firewall.

Multifunctional Cord 110 may store and execute instructions that enable packets and/or traffic received from black listed devices and/or IP addresses from being transmitted to the first device (or any device with which Multifunctional Cord 110 has authenticated).

Denial of Electronic Attack.

Multifunctional Cord 110 may store and execute instructions to identify when malicious software has been detected and/or when an electronic attack has been initiated and/or is underway and may prevent any communication to the first device.

Figure 2:
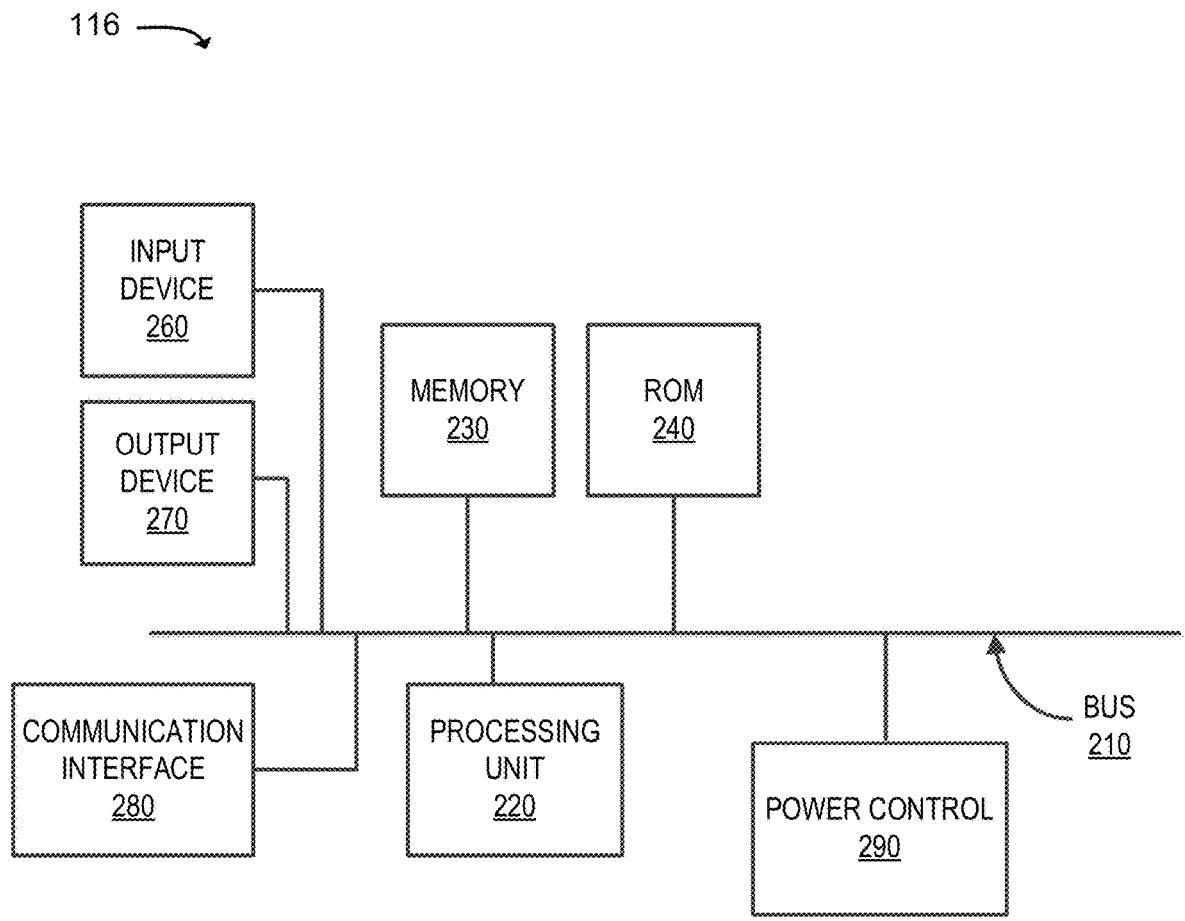
FIG. 2 illustrates a diagram of example components that may correspond to the control block of FIG. 1.

Referring now to FIG. 2, block 116 may include a collection of components, such as a bus 210, a processing unit 220, a memory 230, a read-only memory ("ROM") 240, an input device 260, an output device 270, a communication interface 280 and/or a power control 290. Bus 210 may include a path that permits communication among the components of block 116.

Although FIG. 2 depicts example components of block 116, in other implementations, block 116 may include fewer components, additional components, different components, or differently arranged components than illustrated in FIG. 2. For example, block 116 may include a user device. In still other implementations, one or more components of block 116 may perform one or more tasks described as being performed by one or more other components of block 116.

Processing unit 220 may include a processor, multiple processors, microprocessors, or other types of processing logic that may interpret, execute, and/or otherwise process information and/or data contained in, for example, and/or memory 230. The information may include computer-executable instructions and/or data that may implement one or more embodiments of the Systems and/or Methods. Processing unit 220 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. Processing unit 220 may comprise a single core or multiple cores. Moreover, processing unit 220 may comprise a system-on-chip (SoC) or system-in-package (SiP). Additionally, or alternatively, processing unit 220 (and/or another component of block 116) may be configured to generate and/or update keys (e.g., encryption keys, rotating keys, etc.).

Memory 230 may include a random-access memory (RAM) or another type of dynamic storage device that may store information and instructions for execution by processing unit 220. Memory 230 may store information that identifies one or more user devices 120 with which multifunctional cord 110 is authorized to communicate, receive power, and/or receive security services. Memory 230 may also, or alternatively, store information that identifies which services (e.g., communications, electrical power, security, etc.) each user device 120. Memory 230 may store information that identifies one or more users that are authorized to use multi-functional cord 110. ROM 240 may include a ROM device or another type of static storage device that may store static information and/or instructions for use by processing unit 220.

Input device 260 may include a mechanism that permits an operator to input information to block 116, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator, including a display, a speaker, etc. In the case of a display, the display may be a touch screen display that acts as both an input and an output device. Input device 260 and/or output device 270 may be haptic type devices, such as joysticks or other devices based on touch.

Communication interface 280 may include any transceiver-like mechanism that enables block 116 to communicate with other devices and/or systems. For example, communication interface 280 may include mechanisms for communicating with another device or system via a network, e.g., a network interface card.

Block 116 may perform certain operations in response to processing unit 220 executing software instructions contained in a computer-readable medium, such as main memory 230. For instance, block 116 may implement an application by executing software instructions from main memory 230. A computer-readable medium may be defined as a non-transitory memory device, where the memory device may include a number of physically, possibly distributed, memory devices. The software instructions may be read into main memory 230 from another device via communication interface 280. The software instructions contained in main memory 230 may cause processing unit 220 to perform processes that will be described later. Alternatively, hardwired circuitry may be used in place of, or in combination with, software instructions to implement processes described herein. Thus, implementations described herein are not limited to any specific combination of hardware circuitry and software.

Power control 290 may implement instructions from processing unit 220 to control whether block 116 will enable power to flow to and/or from user device 120 with which multi-functional cord 110 is associated. Power control 290 may include a switch that, when closed, allows electrical power to flow and when open precludes electrical power from flowing.

Figure 3:
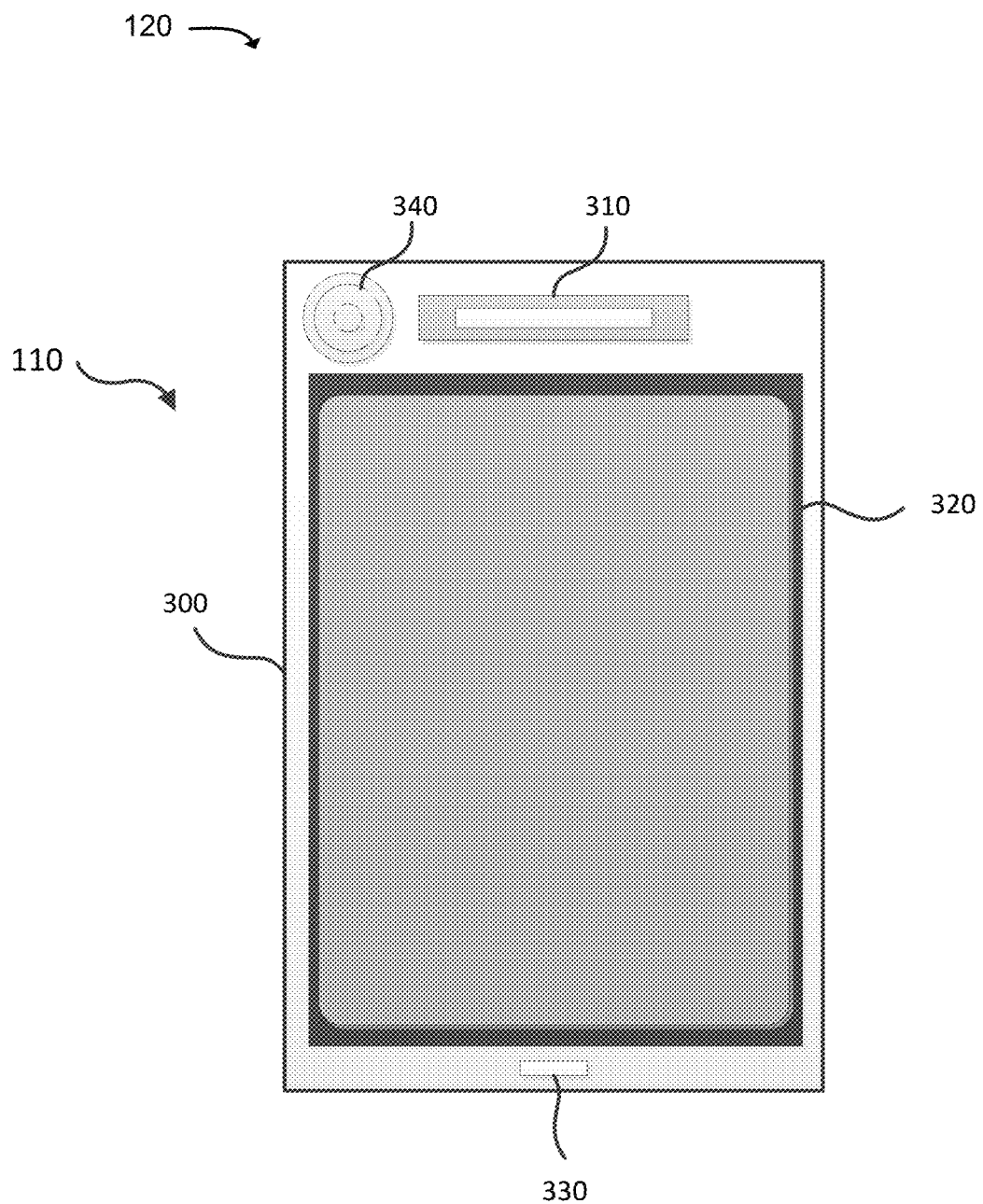
FIG. 3 illustrates a schematic view of an example user device of FIG. 1.

FIG. 3 is a diagram of an example user device 120. As shown in FIG. 3, user device 120 may include a housing 300, a speaker 310, a display 320, a microphone 330. Housing 300 may include a chassis via which some or all of the components of user device 120 are mechanically secured and/or covered. Speaker 310 may include a component to receive input electrical signals from user device 120 and to transmit audio output signals, which communicates audible information to a user of user device 120.

Although FIG. 3 depicts example components of user device 120, in other implementations, user device 120 may include fewer components, additional components, different components, or differently arranged components than illustrated in FIG. 3. For example, user device 120 may include a keyboard, a keypad, and/or other input components. In other implementations, one or more components of user device 120 may perform one or more tasks described as being performed by one or more other components of user device 120. In still other implementations, user device 120 may include and/or be configured to be in wired and/or wireless communication with cord 110, network 130 and/or another user device 120, such that user device 120 may send and/or receive data to and/or from cord 110 and/or another user device 120 via network 130.

Display 320 may include a component to receive input electrical signals and present a visual output in the form of text, images, videos and/or combinations of text, images, and/or videos which communicate visual information to the user of user device 120. In one implementation, display 320 may display text input into user device 120, text, images, and/or video received from another user device 120, and/or information regarding incoming or outgoing calls or text messages, emails, media, games, phone books, address books, the current time, and the like.

Display 320 may be a touch screen that presents one or more images that corresponds to control buttons. The one or more images may accept, as input, mechanical pressure from the user (e.g., when the user presses or touches an image corresponding to a control button or combinations of control buttons) and display 320 may send electrical signals to a processor associated with user device 120 that may cause user device 120 to perform one or more operations. For example, the control buttons may be used to cause user device 120 to transmit information. Display 320 may present one or more other images associated with a keypad that, in one example, corresponds to a standard telephone keypad or another arrangement of keys. Microphone 330 may include a component to receive audible information from the user and send, as output, an electrical signal that may be stored by user device 120, transmitted to another user device 120 or cause the user device 120 to perform one or more operations.

Microphone 330 may include a component to receive audible information from the user and send, as output, an electrical signal that may be stored by user device 120, transmitted to another user device, or cause the device to perform one or more operations. Camera 340 may be provided on a front or back side of user device 120, and may include a component to receive, as input, analog optical signals and send, as output, a digital image or video that can be, for example, viewed on display 320, stored in the memory of user device 120, discarded and/or transmitted to another user device 120.

Figure 4:
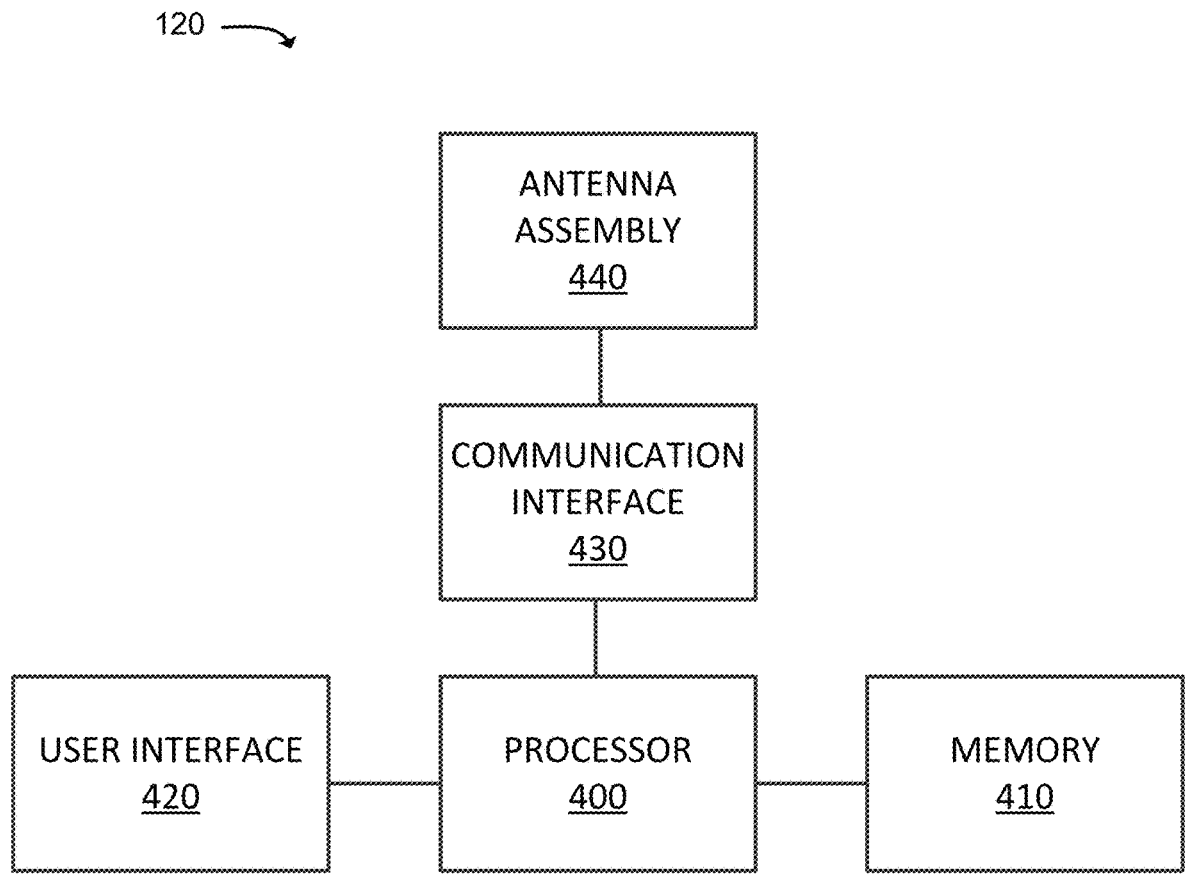
FIG. 4 illustrates a diagram of example components of the user device of FIG. 3.

FIG. 4 is a diagram of example components of user device 120. As shown in FIG. 4, user device 120 may include a processor 400, a memory 410, a user interface 420, a communication interface 430, and/or an antenna assembly 440. Although FIG. 4 shows example components of user device 120, in other implementations, user device 120 may include fewer components, additional components, different components, or differently arranged components than depicted in FIG. 4. In still other implementations, one or more components of user device 120 may perform one or more tasks described as being performed by one or more other components of user device 120.

Processor 400 may include a processor, a microprocessor, an ASIC, a FPGA, or the like. Processor 400 may control operation of user device 120 and its components. In one implementation, processor 400 may control operation of components of user device 120 in a manner similar to that described herein. Memory 410 may include a RAM, a ROM, and/or another type of memory to store data and/or instructions that may be used by processor 400.

User interface 420 may include mechanisms for inputting information to user device 120 and/or for outputting information from user device 120. Examples of input and output mechanisms might include buttons (e.g., control buttons, keys of keypad, a keyboard, a joystick, etc.); a touch screen interface to permit data and control commands to be input into user device 120 via display 320; a speaker (e.g., speaker 310) to receive electrical signals and output audio signals; a microphone (e.g., microphone 330) to receive audio signals and output electrical signals; a display (e.g., display 320) to output visual information (e.g., user interfaces, web pages, etc.); a vibrator to cause user device 120 to vibrate; and/or camera 340 to receive video and/or images.

Communication interface 430 may include a transceiver to perform functions of both a transmitter and a receiver of wireless communications, wired communications, or a combination of wireless and wired communications, including communications to/from user device 120 and another user device 120.

User device 120 may perform certain operations described herein in response to processor 400 executing software instructions of an application contained in a computer-readable medium, such as memory 410. The software instructions may be read into memory 410 from another computer-readable medium or from another device via communication interface 430. The software instructions contained in memory 410 may cause processor 400 to perform processes that will be described later. Alternatively, hardwired circuitry may be used in place of or in combination with software instructions to implement processes described herein. Thus, implementations described herein are not limited to any specific combination of hardware circuitry and software.

Memory 410 may store information and instructions for execution by processor. sensitive data may be read into memory 410 from another computer-readable medium, from another device and/or user device 120 via communication interface 430, and/or from user interface 420. For example, memory 410 may store an application (e.g., a mobile application, logic, software application installed on a user device, a combination of software and hardware, etc.) that, when executed, can be used to communicate with control block 116 and/or to program control block 116.

Figure 5:
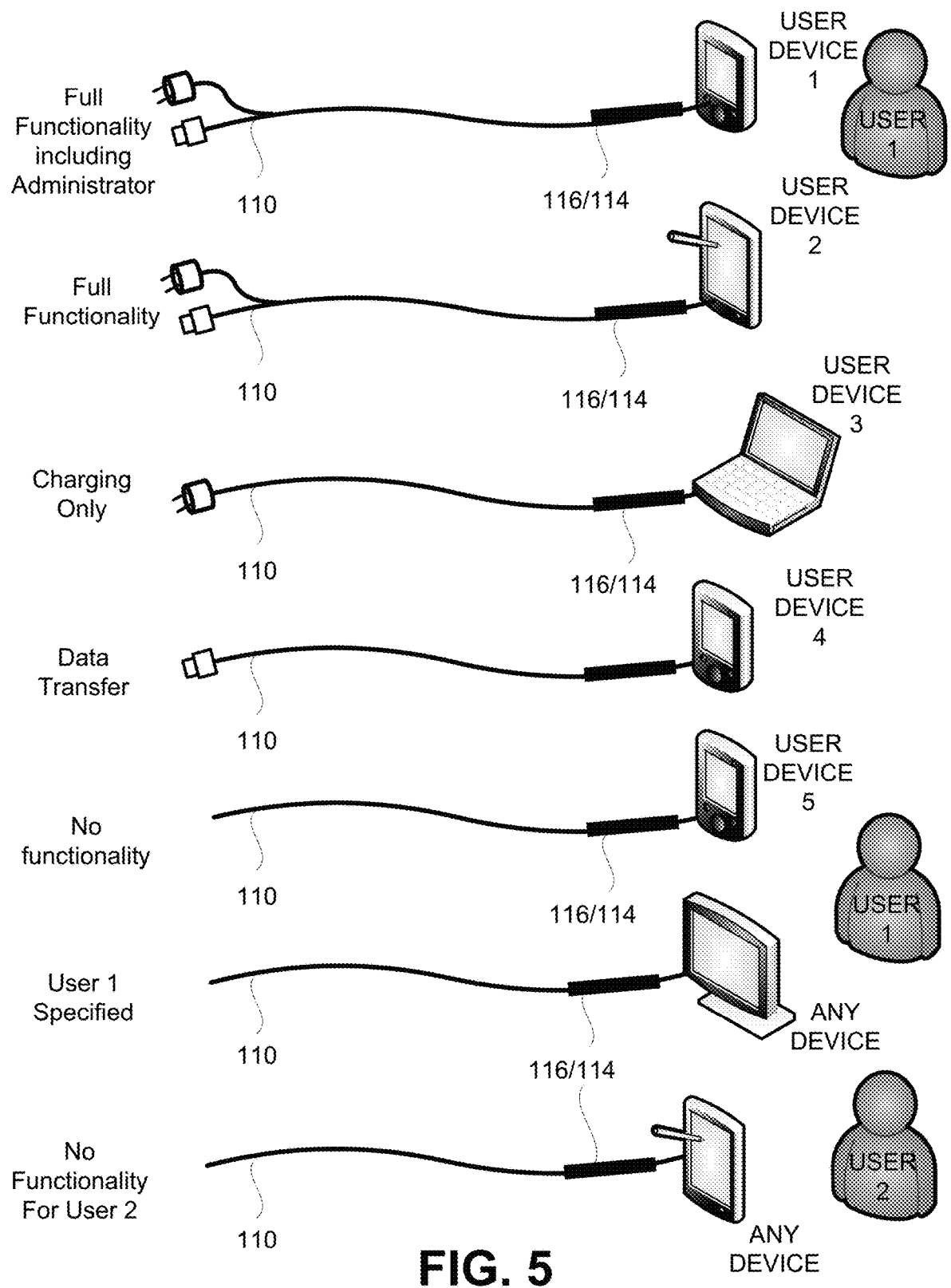
FIG. 5 illustrates example embodiments of the multifunctional cord, of FIG. 1, in which the systems, methods, and/or devices described herein may be implemented.

FIG. 5 illustrates example embodiments of the multifunctional cord 110 in which the systems, methods, and/or devices described herein may be implemented. As shown in FIG. 5, multi-functional cord 110 may be programmed in a manner that authorizes communication with a first user device 120 (shown as user device 1 in FIG. 5). Communication with first user device 120 may be authorized when a first user, associated with first user device 120, can be authenticated. For example, the first user may plug multi-functional cord 110 into first user device 120 to obtain information associated with first user device 120 (e.g., an MDN, an ESN, etc.). Control block 116 may authenticate first user device 120 when the information associated with first user device 120 matches information, associated with first user device 120, stored in a memory associated with block 116. Control block 116 may not authenticate first user device 120 when the information, associated with first user device 120, does not match the store information. In the event that first user device 120 is authenticated, control block 116 may authenticate the first user by obtaining information, associated with the first user, from first user device 120 (e.g., a SIM URI, a etc.) and/or from information entered by the first user (e.g., username, password, PIN, biometric information, etc.) via a user interface provided by the application being executed on first user device 120. Control block 116 may authenticate the first user if the obtained information, associated with the user, matches stored information associated with the first user and may not authenticate the first user when the obtained information does not match the store information. If control block 116 can authenticate first user device 120 and the first user, then control block may authorize one or more services to be made available to first user device 120. Control block 114 may obtain, from a memory, information that identifies which services are authorized for first user device 120. In this non-limiting example, the information that indicates that user device 120 is authorized to receive full functionality (e.g., charging, data communications, security services, etc.) as well as administrative rights (e.g., to enable first user to program multi-functional cord 110).

In another non-limiting example, multi-functional cord 110 may be programmed (e.g., by first user using first user device 120) to authorize one or more services to be made available to a second user device 120 (e.g., shown as user device 2 in FIG. 5). In this example, second user device 120 may be authorized to receive full functionality (e.g., charging, data communications, security services, etc.) from multi-functional cord 110 without authenticating the first user. Such authorization may not include administrative rights.

In yet another non-limiting example, multi-functional cord 110 may be programmed (e.g., by first user using first user device 120) to authorize charging of a third user device 120 (e.g., shown as user device 3 in FIG. 5) when multi-functional cord 110 is connected to an electrical power supply. In this example, third user device 120 may not be authorized to send and/or receive data, security services, etc.

In still another non-limiting example, multi-functional cord 110 may be programmed (e.g., by first user using first user device 120) to authorize data communications of a fourth user device 120 (e.g., shown as user device 4 in FIG. 5) when multi-functional cord 110 is connected to another user device 120 and/or network 130. Additionally, or alternatively, multi-functional cord 110 may be programmed to provide a security service to the fourth user 120. In this example, fourth user device 120 may not be authorized to receive electrical power to charge fourth user device 120.

In another non-limiting example, multi-functional cord 110 may be programmed (e.g., by first user using first user device 120) in a manner that does not authorize a fifth user device 120 (e.g., shown as user device 5 in FIG. 5) to receive any services from multi-functional cord 110.

In another non-limiting example, multi-functional cord 110 may be programmed to communicate with any user device 120 (e.g., shown as any device in FIG. 5) that the first user authorizes without authenticating any user device 120. In this example, the type of service (e.g., charging, data communication, security, etc.) that any authorized user device 120 may receive may be authorized by the first user.

In yet another non-limiting example, multi-functional cord 110 may be programmed to not to communicate with any user device 120 (e.g., shown as any device in FIG. 5) with which a second user (e.g., shown as user 2 in FIG. 5) is associated. In this example, any user device 120 with which the second user is associated may not receive any services from multi-functional cord 110.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as APPLETS, etc.), or both. Further, connection to other computing devices such as network input/output devices may be employed.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A controller for use with a mobile electronic device, the controller comprising:
    a first connector configured to operably interface with the mobile electronic device to selectively deliver power or data to the mobile electronic device;
    a second connector configured to selectively receive power or data from a power source or a data source; and,
    an electronics module operably engaged with the first connector and the second connector, the electronics module comprising a processor, a non-transitory computer readable medium, and circuitry operable to selectively transmit or receive data or power between the second connector and the first connector in response to one or more operations by the processor, the non-transitory computer readable medium having stored thereon a set of instructions executable by the processor to cause the processor to perform the one or more operations, the set of instructions comprising:
        instructions for configuring the mobile electronic device operably interfaced with the first connector as a unique administrator device;
        instructions for authorizing the unique administrator device to receive a full functionality of available services of the controller, wherein the full functionality of available services comprises administrative rights;
        instructions for configuring and authorizing a non-administrator mobile electronic device operably interfaced with the first connector to have a functionality of available services of the controller based on one or more transfer permissions defining a selective transmission of power or data between the first connector and the second connector, the one or more transfer permissions being configurable by the unique administrator device, wherein the functionality of available services authorized for the non-administrator mobile electronic device does not comprise the administrative rights; and
        instructions for authenticating the power source or the data source associated with the second connector,
            wherein, the electronics module is configured to disable the transmission of power or data between the first connector and the second connector to the non-administrator mobile electronic device and enable the transmission of power or data between the first connector and the second connector to the unique administrator device, in accordance with the one or more transfer permissions.

2. The controller of claim 1 wherein the set of instructions further comprise instructions for authorizing a user of the unique administrator device as an administrator, the administrator having administrative rights to program the set of instructions executable by the processor.

3. The controller of claim 1 wherein the set of instructions further comprise instructions for preventing power or data from traveling to or from a non-authenticated power source or data source associated with the second connector.

4. The controller of claim 1 wherein the set of instructions further comprise instructions for detecting a presence of malicious software or an electronic attack being received from the second connector.

5. The controller of claim 1 wherein the one or more transfer permissions are based on input of an administrator through a software application installed on the unique administrator device.

6. An apparatus for use with a mobile electronic device, the apparatus comprising:
    a cord having a first connector configured to operably interface with an electronic device or a power source, the cord being comprised of one or more electrical conductors operable to selectively transmit electrical power signals or data packets therethrough; and,
    a controller operably coupled to the cord and being configured to selectively receive the electrical power signals or data packets from the cord, the controller being comprised of an electronics module and a second connector configured to operably interface with the mobile electronic device, the electronics module comprising a processor, a non-transitory computer readable medium, and circuitry operable to selectively transmit the electrical power signals or data packets from the cord to the mobile electronic device operably interfaced with the second connector in response to one or more operations by the processor, the non-transitory computer readable medium having stored thereon a set of instructions to cause the processor to perform the one or more operations, the set of instructions comprising:
        instructions for configuring the mobile electronic device operably interfaced with the second connector as a unique administrator device;
        instructions for authorizing the unique administrator device to receive a full functionality of available services of the controller, wherein the full functionality of available services authorized for the unique administrator device comprises administrative rights;

instructions for configuring a non-administrator mobile electronic device associated with the second connector based on input of a user of the unique administrator device;

instructions for authorizing the non-administrator mobile electronic device to receive a functionality of available services of the controller based on one or more transfer permissions defining a selective transmission of the electrical power signals or data packets through the cord from the first connector to the second connector, the one or more transfer permissions being configurable by the unique administrator device, wherein the functionality of available services authorized for the non-administrator mobile electronic device does not comprise the administrative rights; and instructions for authenticating the electronic device or the power source associated with the first connector, wherein, the controller is configured to disable the transmission of the electrical power signals or data packets between the first connector and the second connector to the non-administrator mobile electronic device and enable the transmission of the electrical power signals or data packets between the first connector and the second connector to the unique administrator device, in accordance with the one or more transfer permissions.

7. The apparatus of claim 6 wherein the set of instructions further comprise instructions for authorizing the user of the unique administrator device as an administrator, the administrator having administrative rights to program the set of instructions executable by the processor.

8. The apparatus of claim 6 wherein the set of instructions further comprise instructions for detecting a presence of data packets associated with malicious software being received from the first connector.

9. The apparatus of claim 6 wherein the controller further comprises an input/output interface.

10. The apparatus of claim 6 further comprising a battery pack operably engaged with the controller.

11. The apparatus of claim 6 wherein the electronics module further comprises a wireless communication chipset operably engaged with the processor.

12. The apparatus of claim 7 wherein the set of instructions further comprise instructions for configuring two or more non-administrator mobile electronic devices associated with the second connector based on an input of the administrator.

13. The apparatus of claim 6 wherein the one or more transfer permissions are based on input of an administrator through a software application installed on the unique administrator device.

14. A multi-functional cord system, comprising:

a cord having a first connector configured to operably interface with an electronic device or power source, the cord being comprised of one or more electrical conductors operable to selectively transmit electrical power signals or data packets therethrough;

a controller operably coupled to the cord and being configured to selectively receive the electrical power signals or data packets from the cord, the controller being comprised of an electronics module and a second connector configured to operably interface with a mobile electronic device, the electronics module comprising a processor, a non-transitory computer readable medium, and circuitry operable to selectively transmit the electrical power signals or data packets from the cord to the mobile electronic device operably interface with the second connector in response to one or more operations by the processor; and, a software application executing on the mobile electronic device operably interfaced with the second connector, the software application being operable to receive a user input from a user of the mobile electronic device operably interfaced with the second connector and to communicate the user input to the controller, the user input corresponding to a set of instructions stored on the non-transitory computer readable medium, the set of instructions executable by the processor to cause the processor to perform the one or more operations associated therewith, the set of instructions comprising:

instructions for configuring the mobile electronic device operably interfaced with the second connector as a unique administrator device;

instructions for authorizing the unique administrator device to receive a full functionality of available services of the controller, wherein the full functionality of available services authorized for the unique administrator device comprises administrative rights;

instructions for authenticating the user of the unique administrator device as an administrator;

instructions for configuring a non-administrator mobile electronic device associated with the second connector based on input from the administrator;

instructions for authorizing the non-administrator mobile electronic device to receive a functionality of available services of the controller based on one or more transfer permissions defining a selective transmission of the electrical power signals or data packets through the cord from the first connector to the second connector, the one or more transfer permissions being configurable by the unique administrator device, wherein the functionality of available services authorized for the non-administrator mobile electronic device does not comprise the administrative rights; and instructions for authenticating the electronic device or the power source associated with the first connector, wherein, the controller is configured to disable the transmission of the electrical power signals or data packets between the first connector and the second connector to the non-administrator mobile electronic device and enable the transmission of the electrical power signals or data packets between the first connector and the second connector to the unique administrator device, in accordance with the one or more transfer permissions.

15. The multi-functional cord system of claim 14 wherein the electronics module further comprises a wireless communication chipset operably engaged with the processor.

16. The multi-functional cord system of claim 14 wherein the controller is operable to send and receive communications to and from the software application via a wireless communications interface.

17. A controller for use with an electronic device, the controller comprising:

a first connector configured to operably interface with the electronic device to selectively receive or transmit power or data to or from the electronic device;

a second connector configured to selectively receive or transmit power or data from a power source or a data source; and, an electronics module operably engaged with the first connector and the second connector to selectively facilitate a transmission of power or data therebetween, the electronics module comprising a processor, a non-transitory computer readable medium, and circuitry operable to selectively transmit or receive power or data between the first connector and the second connector in response to one or more operations of the processor, the non-transitory computer readable medium having stored thereon a set of instructions executable by the processor to cause the processor to perform the one or more operations, the set of instructions comprising:

instructions for authorizing a first user of the electronic device operably interfaced with the first connector as an administrator, wherein the administrator has a full functionality of available services of the controller, the full functionality of available services comprising administrative rights;

instructions for configuring the electronic device operably interfaced with the first connector of which the administrator is the first user as a unique administrator device having the full functionality of available services of the controller based on the authorization of the administrator;

instructions for authorizing a second user of a second electronic device operably interfaced with the first connector as a non-administrator, wherein a functionality of available services authorized for the non-administrator excluding the administrative rights and being based on one or more transfer permissions that define a selective transmission of power or data between the first connector and the second connector, the one or more transfer permissions configurable by the administrator;

instructions for configuring the second electronic device operably interfaced with the first connector of which the non-administrator is the second user as a non-administrative mobile device having the functionality of available services of the controller based on the authorization of the non-administrator; and instructions for authenticating the power source or the data source associated with the second connector,
wherein, the electronics module is configured to disable the transmission of power or data between the first connector and the second connector to the non-administrator mobile electronic device and enable the transmission of power or data between the first connector and the second connector to the unique administrator device, in accordance with the one or more transfer permissions.

* * * * *